(12) United States Patent
Brack et al.

(10) Patent No.: US 7,601,794 B2
(45) Date of Patent: Oct. 13, 2009

(54) MONOMER SOLUTION FOR PRODUCING POLYCARBONATE

(75) Inventors: Hans-Peter Brack, Herrliberg (CH); Maarten Antoon Jan Campman, Churra-Murcia (ES); Yohana Perez de Diego, Murcia (ES); Martin Herke Oyevaar, Goes (NL); Laurus van der Wekke, Rucphen (NL); Dennis Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 122 days.

(21) Appl. No.: 11/863,659

(22) Filed: Sep. 28, 2007

(65) Prior Publication Data

US 2009/0088540 A1   Apr. 2, 2009

(51) Int. Cl.
*C08G 64/00* (2006.01)
*C08G 63/62* (2006.01)

(52) U.S. Cl. .......................... 528/196; 422/56; 422/57; 422/62; 422/75; 436/75; 436/79; 436/85; 436/95; 436/106; 436/111; 528/198

(58) Field of Classification Search .................. 422/56, 422/57, 62, 75; 436/75, 79, 85, 95, 106, 436/111; 528/196, 198
See application file for complete search history.

(56) References Cited

U.S. PATENT DOCUMENTS

| | | |
|---|---|---|
| 4,323,668 A | 4/1982 | Brunelle |
| 5,091,591 A | 2/1992 | Cipullo |
| 5,151,491 A | 9/1992 | Sakashita et al. |
| 5,276,129 A | 1/1994 | Sakashita et al. |
| 5,525,701 A | 6/1996 | Tominari et al. |
| 5,696,222 A | 12/1997 | Kaneko et al. |
| 6,177,536 B1 | 1/2001 | Anamizu et al. |
| 6,252,036 B1 | 6/2001 | Hatono et al. |
| 6,300,459 B1 | 10/2001 | Kaneko et al. |
| 6,303,734 B1 | 10/2001 | Funakoshi et al. |
| 6,399,739 B1 | 6/2002 | McCloskey et al. |
| 6,403,754 B1 | 6/2002 | McCloskey et al. |
| 6,410,678 B1 | 6/2002 | Ishida et al. |
| 6,410,777 B1 | 6/2002 | Kaneko et al. |
| 6,417,291 B1 | 7/2002 | Kaneko et al. |
| 6,420,512 B1 | 7/2002 | McCloskey et al. |
| 6,420,588 B1 | 7/2002 | McCloskey et al. |
| 6,469,192 B1 | 10/2002 | Burnell et al. |
| 6,500,914 B1 | 12/2002 | Brack et al. |
| 6,506,871 B1 | 1/2003 | Silvi et al. |
| 6,518,391 B1 | 2/2003 | McCloskey et al. |
| 6,525,163 B1 | 2/2003 | Brack et al. |
| 6,548,623 B2 | 4/2003 | Brunelle et al. |
| 6,590,068 B2 | 7/2003 | Brack et al. |
| 6,600,004 B1 | 7/2003 | McCloskey et al. |
| 6,605,686 B2 * | 8/2003 | Takemoto et al. ........... 528/196 |
| 6,653,434 B2 | 11/2003 | Brack et al. |
| 6,706,846 B2 | 3/2004 | Brack et al. |
| 6,710,156 B2 | 3/2004 | Whitney et al. |
| 6,723,823 B2 | 4/2004 | McCloskey et al. |
| 6,734,277 B2 | 5/2004 | Brack et al. |
| 6,747,119 B2 | 6/2004 | Brack et al. |
| 6,887,970 B2 | 5/2005 | Kratschmer et al. |
| 7,132,498 B2 | 11/2006 | McCloskey et al. |
| 2002/0132957 A1 | 9/2002 | Brack et al. |
| 2002/0183477 A1 | 12/2002 | Takemoto et al. |
| 2004/0068086 A1 | 4/2004 | Day et al. |
| 2004/0087756 A1 | 5/2004 | Ramesh et al. |
| 2005/0234211 A1 | 10/2005 | Martinez et al. |
| 2008/0004417 A1 | 1/2008 | Jansen et al. |
| 2008/0004418 A1 | 1/2008 | Jansen et al. |
| 2009/0088538 A1 | 4/2009 | Campman et al. |

FOREIGN PATENT DOCUMENTS

| | | |
|---|---|---|
| JP | 5009282 | 1/1993 |
| JP | 10101786 | 4/1998 |
| JP | 10101787 | 4/1998 |
| JP | 11302228 | 11/1999 |
| JP | 2000129112 | 5/2000 |
| JP | 2002309015 | 10/2002 |
| WO | 03040208 | 5/2003 |
| WO | 03106149 | 12/2003 |

* cited by examiner

*Primary Examiner*—Terressa M Boykin
(74) *Attorney, Agent, or Firm*—Larson & Anderson, LLC

(57) ABSTRACT

A non-reactive monomer mixture is formed from a dihydroxy component having one or more dihydroxy compounds dissolved in a melted diaryl carbonate. The dihydroxy component has less than 600 ppb alkali metal, an acid stabilizer, or both less than 600 ppb alkali metal and an acid stabilizer. The dihydroxy compounds of the dihydroxy component and the diaryl carbonate are present in a mole ratio of from 0.9 to 1.1. The monomer mixture is at a temperature between the saturation point of the monomer mixture and the highest melting temperature of the individual dihydroxy compounds. The non-reactive monomer mixture can be stored and transported and then polymerized to form polycarbonate upon addition of a catalyst.

25 Claims, 5 Drawing Sheets

Influence of Acid Concentration on Inhibiting Conversion in Monomer Solutions

MONOMER SOLUTION FOR PRODUCING POLYCARBONATE

BACKGROUND

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenyl carbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative to those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

Color can be generated in polycarbonates or in copolycarbonates which reduces the transparent quality of resulting articles formed from such. The quality of the starting materials has a large effect on the color of the final polycarbonate. Further, the polymerization and molding conditions used to produce the polycarbonate and molded articles may lead to the formation of side reactions within the polycarbonate leading to color formation therein. It would be beneficial to find a way to improve the color and other properties of polycarbonates.

SUMMARY OF THE INVENTION

The present invention relates to polycarbonate produced by melt transesterification reactions and non-reactive monomer mixtures formed prior to being used in these processes. It has herein been found that by preparing a non-reactive monomer mixture comprising a diaryl carbonate and a dihydroxy component at a temperature below the melting point of the dihydroxy component, one is able to prepare polycarbonates having improved color.

In one embodiment the present invention provides a method of forming a non-reactive monomer mixture suitable for use in a melt transesterification reaction to form polycarbonate, the method comprising the steps of:
(i) providing a diaryl carbonate;
(ii) selecting a first dihydroxy compound,
(iii) performing a dihydroxy conditioning step selected from the group consisting of:
  (a) testing the first dihydroxy compound for the presence of alkali metal prior to forming the non-reactive monomer mixture, and if said alkali metal is present, performing a step selected from the group consisting of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b), and
  (b) treating the first dihydroxy compound with a step selected from the group of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b),
(iv) adjusting the temperature of the diaryl carbonate to a first temperature that is:
  greater than the melting point of the diaryl carbonate; and
  below the melting point of the first dihydroxy compound;
(v) adding the first dihydroxy compound as a solid to the diaryl carbonate, wherein the first temperature is selected such that the first dihydroxy compound added to the diaryl carbonate dissolves in the diaryl carbonate to produce a non-reactive monomer mixture.

In a second embodiment a method of forming polycarbonate is provided. The method comprises the steps of:
(A) forming a non-reactive monomer mixture suitable for use in a melt transesterification reaction to form polycarbonate, the method comprising the steps of:
(i) providing a diaryl carbonate;
(ii) selecting a first dihydroxy compound,
(iii) performing a dihydroxy conditioning step selected from the group consisting of:
  (a) testing the first dihydroxy compound for the presence of alkali metal prior to forming the non-reactive monomer mixture, and if said alkali metal is present, performing a step selected from the group consisting of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b), and
  (b) treating the first dihydroxy compound with a step selected from the group of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b),
(iv) adjusting the temperature of the diaryl carbonate to a first temperature that is:
  greater than the melting point of the diaryl carbonate; and
  below the melting point of the first dihydroxy compound;
(v) adding the first dihydroxy compound as a solid to the diaryl carbonate, wherein the first temperature is selected such that the first dihydroxy compound added to the diaryl carbonate dissolves in the diaryl carbonate to produce a non-reactive monomer mixture,
(B) adding a catalyst to the non-reactive monomer mixture in an amount sufficient to initiate a polymerization reaction between the first dihydroxy compound and the activated diaryl carbonate, thereby forming a melt reaction mixture, (C) allowing the melt reaction mixture to react to build molecular weight, thereby preparing polycarbonate.

In another embodiment the present invention provides a non-reactive monomer mixture consisting of a dihydroxy component dissolved in a melted diaryl carbonate, wherein the dihydroxy component comprises one or more dihydroxy compounds and wherein the dihydroxy component comprises less than 600 ppb alkali metal, an acid stabilizer, or both less than 600 ppb alkali metal and an acid stabilizer. The dihydroxy compounds of the dihydroxy component and the diaryl carbonate are present in a mole ratio of from 0.9 to 1.1, and wherein the monomer mixture is at a temperature between the saturation point of the monomer mixture and the highest melting temperature of the individual dihydroxy compounds.

DETAILED DESCRIPTION

Figure 1:
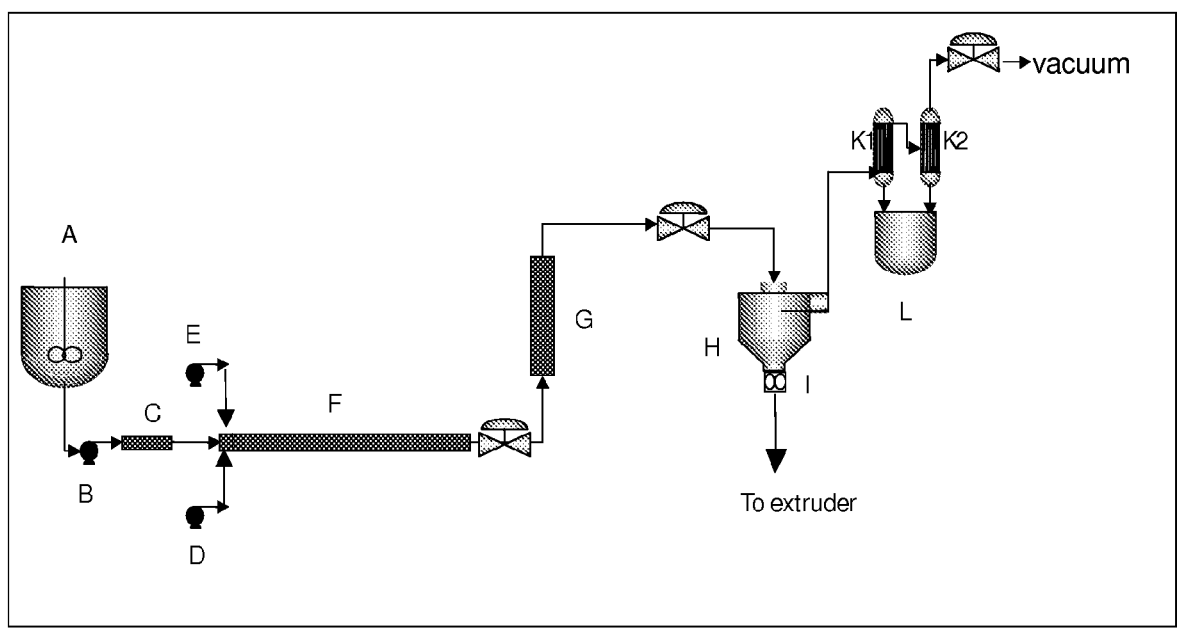
FIG. 1 is a schematic diagram of reactor systems used in the example section.

The present invention may be understood more readily by reference to the following detailed description of preferred embodiments of the invention and the examples included herein. The present invention relates to polycarbonate produced by melt transesterification reactions and to non-reactive monomer mixtures used in these processes. It has herein been found that polymerizing a non-reactive monomer mixture prepared according to the methods of the present invention, one is able to prepare polycarbonates having improved color among other improved properties. Furthermore, the non-reactive monomer mixtures prepared according to the methods of the present invention can be stored for later use and/or transported to polycarbonate production facilities.

Definitions

As used in the specification and claims of this application, the following definitions, should be applied:

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one dihydroxy compound joined by carbonate linkages. In certain embodiments of the invention, the polycarbonate comprises residues of an aromatic dihydroxy compound and has a number average molecular weight, Mn measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"non-reactive monomer mixture" as it is used herein shall be understood to mean that the non-reactive monomer mixture does not substantially react to form byproducts (such as chainstopping byproduct like Sal-OH, methyl carbonate and methyl ether, and other byproducts such as I-SC), polycarbonate oligomer, and/or polycarbonate polymer prior to being used in a subsequent polymerization process. It is preferred that the non-reactive monomer mixture is maintained at a temperature such that the dihydroxy compound is maintained in solution with the diaryl carbonate. The non-reactive monomer mixture preferably will have less than 600 ppb alkali metal present and/or an acid stabilizer present to inhibit a reaction between the diaryl carbonate and the dihydroxy compound. In one embodiment the monomer mixture will react to form polycarbonate polymer or oligomer whilst in the formed non-reactive monomer mixture where less than 15%, more preferably less than 10%, still more preferably less than 5%, and most preferably less than 2% of the diaryl carbonate present in the formed non-reactive monomer mixture is consumed. In another embodiment the monomer mixture will react to form polycarbonate polymer or oligomer whilst in the formed non-reactive monomer mixture where the rate of conversion is less than 5% per hour, preferably less than 1% per hour, more preferably less than 0.5% per hour, and most preferably less than 0.2% per hour. In one embodiment prior to or during formation of the non-reactive monomer mixture the diaryl carbonate and the dihydroxy compound are allowed to partially react. In this later embodiment, it has been found the dissolution temperature of the dihydroxy in the melted diaryl carbonate can be lowered.

The phrase "lowering the temperature of the non-reactive monomer mixture" is herein understood to mean that the temperature of the non-reactive monomer mixture is lowered to a temperature below that where the dihydroxy compound is originally dissolved in the molten diaryl carbonate. In a preferred embodiment the temperature of the non-reactive monomer mixture is lowered to a temperature where the dihydroxy compound is maintained in solution after it has been dissolved. This temperature may be below the melting point of diaryl carbonate owing to freezing point depression of the mixture. In another preferred embodiment the temperature of the non-reactive monomer mixture is lowered to a temperature where the non-reactive monomer mixture may become partly solid or completely solid.

The "Lowest Stable Temperature" (LST) is the approximate lowest temperature at which a particular non-reactive monomer mixture composition remains liquid, free-flowing and capable of being mechanical stirred. Typically the LST is about 5° C. above the temperature at which the particular non-reactive monomer mixture either crystallizes, solidifies, or precipitates. The LST is thus the minimum temperature required to maintain a particular non-reactive monomer mixture composition in free-flowing liquid form in which it can be transferred by means of pumps, valves, fluid flow and gravity.

As used herein the term "Lowest Dissolution Temperature" (LDT) is the lowest temperature of the diaryl carbonate where the dihydroxy completely dissolves in the diaryl carbonate. The lowest dissolution temperature is less than the melting point of the dihydroxy compound. In some embodiments the LDT is above the melting point of the diaryl carbonate. However, in other embodiments the LDT is below the melting point of the diaryl carbonate.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

In a first embodiment the present invention provides a method of forming a non-reactive monomer mixture suitable for use in a melt transesterification reaction to form polycarbonate, the method comprising the steps of:
(i) providing a diaryl carbonate;
(ii) selecting a first dihydroxy compound,
(iii) performing a dihydroxy conditioning step selected from the group consisting of:
  (a) testing the first dihydroxy compound for the presence of alkali metal prior to forming the non-reactive monomer mixture, and if said alkali metal is present, performing a step selected from the group consisting of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b), and
  (b) treating the first dihydroxy compound with a step selected from the group of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b),
(iv) adjusting the temperature of the diaryl carbonate to a first temperature that is:
  greater than the melting point of the diaryl carbonate; and
  below the melting point of the first dihydroxy compound;
(v) adding the first dihydroxy compound as a solid to the diaryl carbonate,
wherein the first temperature is selected such that the first dihydroxy compound added to the diaryl carbonate dissolves in the diaryl carbonate to produce a non-reactive monomer mixture.

In a second embodiment a method of forming polycarbonate is provided. The method comprises the steps of:
(A) forming a non-reactive monomer mixture suitable for use in a melt transesterification reaction to form polycarbonate, the method comprising the steps of:
(i) providing a diaryl carbonate;
(ii) selecting a first dihydroxy compound,
(iii) performing a dihydroxy conditioning step selected from the group consisting of:
  (a) testing the first dihydroxy compound for the presence of alkali metal prior to forming the non-reactive monomer mixture, and if said alkali metal is present, performing a step selected from the group consisting of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b), and
  (b) treating the first dihydroxy compound with a step selected from the group of:
    (I) treating the first dihydroxy compound to reduce the level of said alkali metal to an amount of less than 600 ppb,
    (II) adding an acid stabilizer to the first dihydroxy compound, and
    (III) a combination of steps (a) and (b),
(iv) adjusting the temperature of the diaryl carbonate to a first temperature that is:
  greater than the melting point of the diaryl carbonate; and
  below the melting point of the first dihydroxy compound;
(v) adding the first dihydroxy compound as a solid to the diaryl carbonate,
wherein the first temperature is selected such that the first dihydroxy compound added to the diaryl carbonate dissolves in the diaryl carbonate to produce a non-reactive monomer mixture,
(B) adding a catalyst to the non-reactive monomer mixture in an amount sufficient to initiate a polymerization reaction between the first dihydroxy compound and the activated diaryl carbonate, thereby forming a melt reaction mixture,
(C) allowing the melt reaction mixture to react to build molecular weight, thereby preparing polycarbonate.

In a third embodiment the present invention provides a non-reactive monomer mixture consisting of a dihydroxy component dissolved in a melted diaryl carbonate, wherein the dihydroxy component comprises one or more dihydroxy compounds and wherein the dihydroxy component comprises less than 600 ppb alkali metal, an acid stabilizer, or both less than 600 ppb alkali metal and an acid stabilizer. The dihydroxy compounds of the dihydroxy component and the diaryl carbonate are present in a mole ratio of from 0.9 to 1.1. The monomer mixture is at a temperature greater than the melting point of the diaryl carbonate and below the melting point of the dihydroxy compound.

The Diaryl Carbonate:

In the melt production of polycarbonate, the compounds which react with the dihydroxy compounds to form carbonate linkages (the carbonate source) may be carbonate diesters, carbonyl halides, etc. Specific examples diaryl carbonates include: diphenyl carbonate, ditolyl carbonate, bis(chlorophenyl) carbonate, m-cresyl carbonate dinaphthyl carbonate, bis(diphenyl)carbonate, diethyl carbonate, dimethyl carbonate, dibutyl carbonate, dicyclohexyl carbonate, and other carbonate diesters, phosgene, and other carbonyl halides. Of the various compounds of this type and wherein the reactor system is cleaned using phenol as the phenolic compound, diphenyl carbonate is often preferred.

The diaryl carbonate can also be derived from an activated diaryl carbonate or a mixture of an activated diaryl carbonate with non-activated diaryl carbonate. A preferred activated carbonate of the present invention is an activated diaryl carbonate such as bismethylsalicylcarbonate (BMSC). However, as used herein the term "activated diaryl carbonate" is defined as a diaryl carbonate which is more reactive than diphenyl carbonate toward transesterification reactions. Such activated diaryl carbonates are of the general formula:

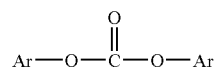

wherein Ar is a substituted aromatic radical having 6 to 30 carbon atoms. The preferred activated diaryl carbonates have the more specific general formula:

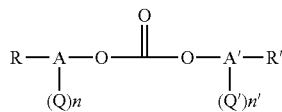

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

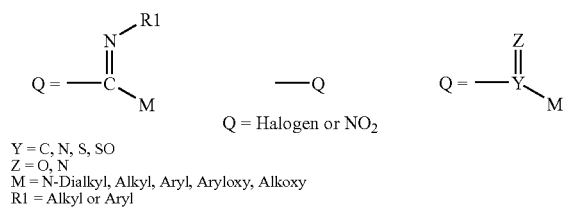

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diaryl carbonate having the structure:

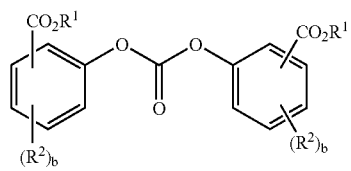

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diaryl carbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis (benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200 C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

The theoretical stoichiometry of the reaction within the melt polymerization reaction mixture requires a molar ratio of dihydroxy composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The following list (Table 1) illustrates representative melting points of non-limiting examples of suitable diaryl carbonates for use with the present invention.

The Dihydroxy Compound:

The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non limiting list of such compounds:

Aliphatic Diols:

Isosorbide: 1,4:3,6-dianhydro-D-sorbitol, Tricyclodecanedimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1, 4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis (hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly (ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

TABLE 1

| Carbonate | Structure | Melting Point (° C.) |
|---|---|---|
| Diphenyl carbonate | [structure of diphenyl carbonate] | 78-79 |
| Ditolyl carbonate | [structure of ditolyl carbonate] | 89-90 |
| Bis-4-nitrophenyl carbonate | [structure of bis-4-nitrophenyl carbonate] | 136-142 |
| Bismethyl salicyl carbonate | [structure of bismethyl salicyl carbonate] | 110-115 |

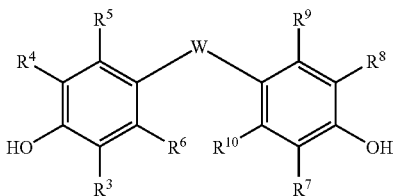

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

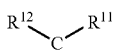

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphati ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

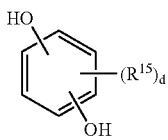

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

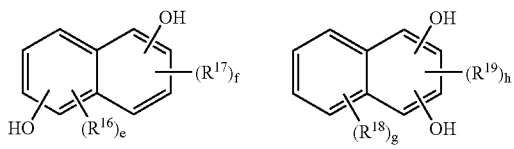

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A);
2,2-bis(3-chloro-4-hydroxyphenyl)propane; 2,2-bis(3-bromo-4-hydroxyphenyl)propane;
2,2-bis(4-hydroxy-3-methylphenyl)propane; 2,2-bis(4-hydroxy-3-isopropylphenyl)propane;
2,2-bis(3-t-butyl-4-hydroxyphenyl)propane; 2,2-bis(3-phenyl-4-hydroxyphenyl)propane;
2,2-bis(3,5-dichloro-4-hydroxyphenyl)-propane; 2,2-bis(3,5-dibromo-4-hydroxyphenyl)propane;
2,2-bis(3,5-dimethyl-4-hydroxyphenyl)propane;
2,2-bis(3-chloro-4-hydroxy-5-methylphenyl)propane;
2,2-bis(3-bromo-4-hydroxy-5-methylphenyl)propane;
2,2-bis(3-chloro-4-hydroxy-5-isopropylphenyl)propane;
2,2-bis(3-bromo-4-hydroxy-5-isopropylphenyl)propane;
2,2-bis(3-t-butyl-5-chloro-4-hydroxyphenyl)propane;
2,2-bis(3-bromo-5-t-butyl-4-hydroxyphenyl)propane;
2,2-bis(3-chloro-5-phenyl-4-hydroxyphenyl)propane;
2,2-bis(3-bromo-5-phenyl-4-hydroxyphenyl)propane;
2,2-bis(3,5-disopropyl-4-hydroxyphenyl)propane;
2,2-bis(3,5-di-t-butyl-4-hydroxyphenyl)propane; 2,2-bis(3,5-diphenyl-4-hydroxyphenyl)propane;
2,2-bis(4-hydroxy-2,3,5,6-tetrachlorophenyl)propane;
2,2-bis(4-hydroxy-2,3,5,6-tetrabromophenyl)propane;
2,2-bis(4-hydroxy-2,3,5,6-tetramethylphenyl)propane;
2,2-bis(2,6-dichloro-3,5-dimethyl-4-hydroxyphenyl)propane;
2,2-bis(2,6-dibromo-3,5-dimethyl-4-hydroxyphenyl)propane;
1,1-bis(4-hydroxyphenyl)cyclohexane; 1,1-bis(3-chloro-4-hydroxyphenyl)cyclohexane;
1,1-bis(3-bromo-4-hydroxyphenyl)cyclohexane; 1,1-bis(4-hydroxy-3-methylphenyl)cyclohexane;
1,1-bis(4-hydroxy-3-isopropylphenyl)cyclohexane;
1,1-bis(3-t-butyl-4-hydroxyphenyl)cyclohexane; 1,1-bis(3-phenyl-4-hydroxyphenyl)cyclohexane;
1,1-bis(3,5-dichloro-4-hydroxyphenyl)cyclohexane;
1,1-bis(3,5-dibromo-4-hydroxyphenyl)cyclohexane;
1,1-bis(3,5-dimethyl-4-hydroxyphenyl)cyclohexane;
1,1-bis(3-chloro-4-hydroxy-5-methylphenyl)cyclohexane;
1,1-bis(3-bromo-4-hydroxy-5-methylphenyl)cyclohexane;
1,1-bis(3-chloro-4-hydroxy-5-isopropylphenyl)cyclohexane;
1,1-bis(3-bromo-4-hydroxy-5-isopropylphenyl)cyclohexane;
1,1-bis(3-t-butyl-5-chloro-4-hydroxyphenyl)cyclohexane;
1,1-bis(3-bromo-5-t-butyl-4-hydroxyphenyl)cyclohexane;
1,1-bis(3-chloro-5-phenyl-4-hydroxyphenyl)cyclohexane;
1,1-bis(3-bromo-5-phenyl-4-hydroxyphenyl)cyclohexane;
1,1-bis(3,5-disopropyl-4-hydroxyphenyl)cyclohexane;
1,1-bis(3,5-di-t-butyl-4-hydroxyphenyl)cyclohexane;
1,1-bis(3,5-diphenyl-4-hydroxyphenyl)cyclohexane;
1,1-bis(4-hydroxy-2,3,5,6-tetrachlorophenyl)cyclohexane;
1,1-bis(4-hydroxy-2,3,5,6-tetrabromophenyl)cyclohexane;
1,1-bis(4-hydroxy-2,3,5,6-tetramethylphenyl)cyclohexane;
1,1-bis(2,6-dichloro-3,5-dimethyl-4-hydroxyphenyl)cyclohexane;
1,1-bis(2,6-dibromo-3,5-dimethyl-4-hydroxyphenyl)cyclohexane;
1,1-bis(4-hydroxyphenyl)-3,3,5-trimethylcyclohexane;
1,1-bis(3-chloro-4-hydroxyphenyl)-3,3,5-trimethylcyclohexane;
1,1-bis(3-bromo-4-hydroxyphenyl)-3,3,5-trimethylcyclohexane;
1,1-bis(4-hydroxy-3-methylphenyl)-3,3,5-trimethylcyclohexane;
1,1-bis(4-hydroxy-3-isopropylphenyl)-3,3,5-trimethylcyclohexane;
1,1-bis(3-t-butyl-4-hydroxyphenyl)-3,3,5-trimethylcyclohexane;
1,1-bis(3-phenyl-4-hydroxyphenyl)-3,3,5-trimethylcyclohexane;
1,1-bis(3,5-dichloro-4-hydroxyphenyl)-3,3,5-trimethylcyclohexane;

1,1-bis(3,5-dibromo-4-hydroxyphenyl)-3,3,5-trimethylcyclohexane;
1,1-bis(3,5-dimethyl-4-hydroxyphenyl)-3,3,5-trimethylcyclohexane;
1,1-bis(3-chloro-4-hydroxy-5-methylphenyl)-3,3,5-trimethylcyclohexane;
1,1-bis(3-bromo-4-hydroxy-5-methylphenyl)-3,3,5-trimethylcyclohexane;
1,1-bis(3-chloro-4-hydroxy-5-isopropylphenyl)-3,3,5-trimethylcyclohexane;
1,1-bis(3-bromo-4-hydroxy-5-isopropylphenyl)-3,3,5-trimethylcyclohexane;
1,1-bis(3-t-butyl-5-chloro-4-hydroxyphenyl)-3,3,5-trimethylcyclohexane;
1,1-bis(3-bromo-5-t-butyl-4-hydroxyphenyl)-3,3,5-trimethylcyclohexane;
bis(3-chloro-5-phenyl-4-hydroxyphenyl)-3,3,5-trimethylcyclohexane;
1,1-bis(3-bromo-5-phenyl-4-hydroxyphenyl)-3,3,5-trimethylcyclohexane;
1,1-bis(3,5-disopropyl-4-hydroxyphenyl)-3,3,5-trimethylcyclohexane;
1,1-bis(3,5-di-t-butyl-4-hydroxyphenyl)-3,3,5-trimethylcyclohexane;
1,1-bis(3,5-diphenyl-4-hydroxyphenyl)-3,3,5-trimethylcyclohexane;
1,1-bis(4-hydroxy-2,3,5,6-tetrachlorophenyl)-3,3,5-trimethylcyclohexane;
1,1-bis(4-hydroxy-2,3,5,6-tetrabromophenyl)-3,3,5-trimethylcyclohexane;
1,1-bis(4-hydroxy-2,3,5,6-tetramethylphenyl)-3,3,5-trimethylcyclohexane;
1,1-bis(2,6-dichloro-3,5-dimethyl-4-hydroxyphenyl)-3,3,5-trimethylcyclohexane;
1,1-bis(2,6-dibromo-3,5-dimethyl-4-hydroxyphenyl)-3,3,5-trimethylcyclohexane;
4,4'dihydroxy-1,1-biphenyl; 4,4'-dihydroxy-3,3'-dimethyl-1,1-biphenyl;
4,4'-dihydroxy-3,3'-dioctyl-1,1-biphenyl; 4,4'-dihydroxydiphenylether;
4,4'-dihydroxydiphenylthioether; 1,3-bis(2-(4-hydroxyphenyl)-2-propyl)benzene;
1,3-bis(2-(4-hydroxy-3-methylphenyl)-2-propyl)benzene;
1,4-bis(2-(4-hydroxyphenyl)-2-propyl)benzene, and
1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers. If other comonomers are used, they can be added as part of the same feed, in a separate feed, or both.

The following list (Table 2) illustrates representative melting points of non-limiting examples of suitable dihydroxy compounds for use with the present invention.

TABLE 2

| Diol or Diacid | Structure | Melting Point (° C.) |
|---|---|---|
| PPP-BP | 3,3-Bis(4-hydroxyphenyl)-2-phenyl-2,3-dihydroisoindol-1-one | 293-296 |
| BP | Biphenol | 280-282 |
| DMBPC | bis(3-methyl-4-hydroxyphenyl) cyclohexane | 190 |

TABLE 2-continued

| Diol or Diacid | Structure | Melting Point (° C.) |
|---|---|---|
| HQ | 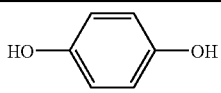<br>Hydroquinone | 171 |
| MeHQ | 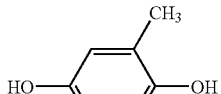<br>Methyl Hydroquinone | 126 |
| SBI | 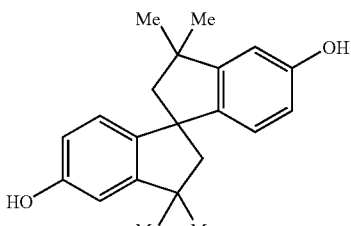<br>6,6-dihydroxy-3,3,3',3'-tetramethyl-1,1'-spirobiidane | 217-218 |
| DDDA | 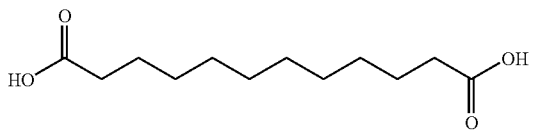<br>Dodecanedioic acid | 125-130 |
| RS | 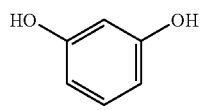<br>Resorcinol | 110-113 |
| TBHQ | 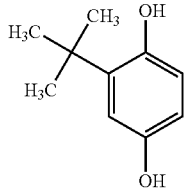<br>tert-butyl Hydroquinone | 125-130 |
| Pluronics PE3500 | 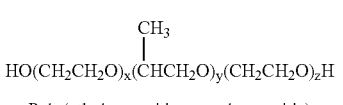<br>Poly(ethylene oxide-propylene oxide) block copolymer | 61-64 |

The Phenolic Compound

As a melt reaction proceeds using a diaryl carbonate and dihydroxy compound to form polycarbonate, the diaryl carbonate is consumed and a phenolic by-product is generated. The phenolic by-product is typically removed from reaction system to drive the polymerization reaction toward higher conversion. The structure of the phenolic by-product will depend on what diaryl carbonate is employed as the carbonate source and thus can be an ester-substituted phenol or a non-ester-substituted phenol. For example, if a diaryl carbonate such as diphenyl carbonate (DPC) is employed, a typical phenolic by-product will be a non-ester-substituted phenol, such as phenol. If an activated diaryl carbonate (i.e. ester substituted diaryl carbonate) such as bismethylsalicylcarbonate (BMSC) is employed, a typical phenolic by-product will be an ester-substituted phenol such as methyl salicylate.

It is believed that a higher concentration of the phenolic compound in the reaction mixture will lead to slower polymerization rates in the mixture. Therefore it is believed that the addition of a phenolic compound to the diaryl carbonate in the non-reactive monomer mixture will aid in delaying the polymerization reaction. Further, it is believed that the addition of the phenolic compound will also aid in maintaining the dihydroxy compound in solution and prevent it from crystalizing out of solution. Thus in another embodiment of the present invention the method further comprises the addition of a phenolic compound to the diaryl carbonate. Non-limiting examples of other suitable phenolic compounds are found in U.S. application Ser. No. 11/275,110 filed on Dec. 12, 2005 which is incorporated herein by reference for all purposes.

The Acid Stabilizer:

It has also been found that the polymerization reaction can be further inhibited and/or delayed by the addition of an acid stabilizer to the non-reactive monomer mixture. The particular acid stabilizer is not particularly limited. However, in some embodiments it has been found that the addition of a phosphorus containing acid (e.g. $H_3PO_4$) improves properties including color properties of polycarbonate. Other suitable and non limiting examples of phosphorus containing acids and additional benefits of adding the phosphorus containing acid on the resulting polycarbonate can be found below in the example section and in U.S. patent application Ser. No. 11/668,551, which is incorporated herein by reference.

The Transesterification Catalyst:

In one embodiment the invention provides a method of producing polycarbonate. In this embodiment a catalyst (or catalyst system) will be added to the non reaction monomer mixture thereby forming a melt reaction mixture that is introduced to the melt polymerization system to build molecular weight of the polycarbonate. The catalyst system used in this method of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

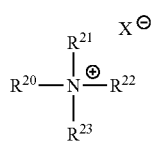

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion X- is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

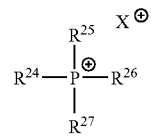

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order to achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1\times10^{-2}$ and $1\times10^{-6}$, preferably between $1\times10^{-4}$ and $1\times10^{-5}$ moles per mole of the first and second dihydroxy compounds combined. The inorganic metal hydroxide catalyst typically will be used in an amount corresponding to between $1\times10^{-5}$ and $1\times10^{-8}$, preferably $1\times10^{-4}$ and $1\times10^{-7}$ moles of metal hydroxide per mole of the first and second dihydroxy compounds combined.

In a third catalyst system according to the method of the present invention, solely a alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

Forming the Non-Reactive Monomer Mixture:

In one embodiment the present invention provides a method of forming the non-reactive monomer mixture. This method comprises the steps of:
(i) providing a diaryl carbonate;
(ii) selecting a first dihydroxy compound,
(iii) performing a dihydroxy conditioning step selected from the group consisting of:
 (a) testing the first dihydroxy compound for the presence of alkali metal prior to forming the non-reactive monomer mixture, and if said alkali metal is present, performing a step selected from the group consisting of:
  (I) treating the first dihydroxy compound to reduce the level of said alkali metal to an amount of less than 600 ppb,
  (II) adding an acid stabilizer to the first dihydroxy compound, and
  (III) a combination of steps (a) and (b), and
 (b) treating the first dihydroxy compound with a step selected from the group of:
  (I) treating the first dihydroxy compound to reduce the level of said alkali metal to an amount of less than 600 ppb,
  (II) adding an acid stabilizer to the first dihydroxy compound, and
  (III) a combination of steps (a) and (b),
(iv) adjusting the temperature of the diaryl carbonate to a first temperature that is:
 greater than the melting point of the diaryl carbonate; and
 below the melting point of the first dihydroxy compound;
(v) adding the first dihydroxy compound as a solid to the diaryl carbonate, wherein the first temperature is selected such that the first dihydroxy compound added to the diaryl carbonate dissolves in the diaryl carbonate to produce a non-reactive monomer mixture.

It is preferred that the method steps occur in the order listed (i.e. steps i, ii, iii, iv, and then v). However, it is herein contemplated that steps occur out of order, for example, step (v) can occur prior to step (iv), inter alia. In the former embodiment, it is preferred that the first dihydroxy compound is added as a solid to molten diaryl carbonate. In the later embodiment, it is preferred that the diaryl carbonate is provided as a solid and the first dihydroxy compound is added to the diaryl carbonate also as a solid and then the diaryl carbonate is melted.

Alkali metals (e.g. lithium, sodium, potassium . . . ) are known to be impurities in several dihydroxy compounds. They can be present individually or combined as salts or as some other structures with other chemicals. Alkali metals can act as a catalyst to the polymerization reaction. To reduce the tendency of the reaction mixture to react, embodiments of the present invention include a dihydroxy conditioning step of testing and treating or simply treating the dihydroxy compound to reduce alkali metal to a level of less than 600 ppb or adding an acid stabilizer to the dihydroxy, or a combination of the two treatment steps. It is believed that when the alkali metal has a presence of less than 600 ppb, more preferably less than 400 ppb, for example less that 200 ppb, or where an acid stabilizer is present that its catalytic effect can be minimized. Where the dihydroxy component is tested for the presence of the alkali metal, the testing mechanism is not particularly limited and can be accomplished by known methods of determining concentration of the alkali metal. The step of testing preferably occurs at the location of formation of the non-reactive monomer mixture. However, the step of testing may be performed "offsite", for example at the dihydroxy's production facility or somewhere in between for example at a third party certification agency, laboratory, or warehouse where the product is tested and assigned a alkali metal grading value. In this later embodiment where the dihydroxy is assigned the alkali metal grading value "offsite", the formation of the non-reactive monomer mixture will proceed based on the assigned alkali metal grading value of the dihydroxy selected for the formation of the non-reactive monomer mixture. For example where a dihydroxy is assigned an alkali metal grading value of less than 600 ppb alkali metal at an off-site location (e.g. a third party chemical supplier), that dihydroxy may be ordered from the supplier and used in the production of the non-reactive monomer mixture and such use fails within the scope of the step "testing the first dihydroxy compound for the presence of alkali metal prior to forming the non-reactive monomer mixture". The step of treating the dihydroxy to reduce alkali metal level likewise is not particularly limited and can occur by known purification methods such as washing and/or distillation. The step of testing and/or treating the dihydroxy component may occur before, during, or after the formation of the non-reactive monomer mixture.

It is believed that the addition of the acid stabilizer also aids in hindering the catalytic effect of the alkali metal and hence in delaying the transesterification reaction to form polycarbonate oligomer and polymer. In one example, the acid stabilizer is added to the dihydroxy component by itself or when it is combined with other reactants. In one embodiment the amount of acid stabilizer added is in an amount such that it is present in the non-reactive monomer mixture between 0.1 and 250 ppm, in other embodiments it is between 1 and 100 ppm. The preferred amount of acid stabilizer on a weight basis (ppm) will depend on factors such as the molecular weight, number of acidic protons per molecule, thermal stability and volatility of the acid stabilizer. The preferred amount will also depend on the temperature of the non-reactive monomer mixture and the amount of basic and/or catalytic impurity species contained in it. For example, adding high amounts of acid stabilizer or adding it repeatedly as a function of time may be used to compensate for loss of the acid stabilizer. Some monomers such as PPP-BP may have enhanced solubility if they are first allowed to partially react with the diaryl carbonate. In this case, it may be advantageous to prepare the monomer solution without the acid stabilizer being present, optionally in the presence of added catalyst, and then adding an acid stabilizer after all of the monomers are dissolved in order to convert the monomer mixture into a non-reactive monomer mixture.

In a preferred embodiment the diaryl carbonate and the dihydroxy compound are added as solids to a stirred vessel. The vessel, and the diaryl carbonate, are heated to a temperature that is greater than the melting point of the diaryl carbonate and below the melting point of the first dihydroxy compound. The amount of the dihydroxy compound added to the diaryl carbonate and the temperature are selected such that the dihydroxy compound dissolves in the diaryl carbonate to produce a non-reactive monomer mixture. In a preferred embodiment the dihydroxy compound and the diaryl carbonate are present in a mole ration of from 0.9 to 1.1.

In another embodiment the diaryl carbonate is added as a solid to a stirred vessel. The temperature of the vessel, and the diaryl carbonate, are adjusted to a temperature above the melting point of the diaryl carbonate and it is melted. The temperature of the diaryl carbonate within the vessel is also below the melting point of a first dihydroxy compound. The first dihydroxy compound is then added to the melted diaryl carbonate.

In another embodiment the diaryl carbonate is added as a solid to a stirred vessel. The temperature of the vessel, and the diaryl carbonate, are adjusted to a temperature above the melting point of the diaryl carbonate and it is melted. A dihydroxy compound having a melting point below the melting point of the diaryl carbonate is added to the diaryl carbonate in the vessel either before, during, or after it is melted. The temperature of the diaryl carbonate (now also containing the dihydroxy compound having a melting point below the melting point of the diaryl carbonate) within the vessel is also below the melting point of a first selected dihydroxy compound having a melting point above the melting point of the diaryl carbonate. The first dihydroxy compound is then added to the melted diaryl carbonate.

In one embodiment the above process occurs in a batch process where the amount of dihydroxy compound and diaryl carbonate are determined and measured prior to forming the non-reactive mixture and that the process occurs to produce a predetermined amount of non-reactive monomer mixture as a feedstock for a subsequent polymerization run.

In yet another preferred embodiment it is possible to produce a non-reactive monomer mixture continuously where the method further comprises the step of continuously drawing off a non-reactive monomer mixture. The steps of providing a diaryl carbonate and adding the first dihydroxy compound to the diaryl carbonate can be performed either continuously or semi-continuously at various stages. In the continuous production mode it may be difficult to maintain a constant molar ratio of dihydroxy compound/diaryl carbonate and care should be taken to ensure desired molar ratios in the resulting monomer mixture.

The amount of dihydroxy compound and the amount of diaryl carbonate are preferably present in a molar ratio (moles dihydroxy compound/mole diaryl carbonate) between 0.8 to 1.2, and more preferably between 0.9 and 1.1. In another embodiment a further dihydroxy compound is added to the non-reactive monomer mixture, where the further dihydroxy compound has a melting point below that of the diaryl carbonate. In this embodiment, the further dihydroxy compound is added at any point during the formation of the non-reactive monomer mixture and melted in the molten components.

In another embodiment after the non-reactive monomer mixture has been prepared the temperature of the monomer mixture may be lowered toward or below the saturation temperature or lowest stable temperature of the mixture and stored for more than 1 hour, for example 12 hours or more than 24 hours. The saturation temperature being the lowest temperature of the mixture where the dihydroxy compound is still in solution. In this embodiment it is preferred that the temperature is lowered to a temperature that is 5 or more degrees above the saturation temperature, for example 10, 15, or 20 degrees above the saturation temperature. In another embodiment the temperature of the non-reactive monomer mixture is lowered to a temperature where the non-reactive monomer mixture becomes solid or partly solid. In this embodiment, the non-reactive monomer mixture may be lowered to a temperature below 100° C. or to or below room temperature. This non-reactive monomer mixture may be stored, transported, and subsequently used in a melt transesterification reaction.

The step of lowering the temperature of the non-reactive monomer mixture may be accompanied with the addition of a second dihydroxy compound to the non-reactive monomer mixture. In this embodiment a second dihydroxy compound is selected, wherein the first dihydroxy compound requires a higher temperature to dissolve in the diaryl carbonate than the second dihydroxy compound. The non-reactive monomer mixture is lowered to a second temperature sufficiently high to maintain the first dihydroxy compound in solution and to permit dissolution of the second dihydroxy compound. The second temperature being between the saturation point of the monomer mixture and the highest melting temperature of the individual dihydroxy compounds. The second dihydroxy compound is added to the mixture at the second temperature as a solid thereby forming a non-reactive monomer mixture comprising the first and second dihydroxy compounds dissolved in the diaryl carbonate. The temperature of this mixture may again be dropped toward or below the saturation or lowest stable temperature of the mixture. In a preferred embodiment the second dihydroxy compound is treated similarly to the first dihydroxy compound where it is tested and treated or simply treated to either reduce the alkali metal concentration or to add an acid stabilizer. In still another preferred embodiment the amount of acid stabilizer added to stabilize the first dihydroxy compound is suitable also to stabilize the second or subsequently added dihydroxy compounds.

In another embodiment the method of forming a non-reactive monomer mixture may further comprise the step of adding a phenolic compound to the diaryl carbonate. It is believed that the addition of the phenolic compound will help to maintain the mixture in a non-reactive state since the rate of the polymerization reaction is largely dependent upon presence of the phenolic by-product. In preferred embodiments this step will occur prior to and/or with the addition of the addition of the dihydroxy compound. However, the addition of the phenolic compound to the diaryl carbonate may occur before, during, or after the formation of the non-reactive monomer mixture. In one example, where the phenolic compound is "added to the diaryl carbonate" during the formation of the non-reactive monomer mixture, it is added to the vessel after any of the steps to prepare the mixture. In another example, where the phenolic compound is "added to the diaryl carbonate" after the formation of the non-reactive monomer mixture, it is added to the mixture itself. In one embodiment it has been found that the presence of the phenolic compound (e.g. methyl salicylate), helps to curb the transesterification reaction thereby aiding in the prevention of substantial polymerization of the non-reactive monomer mixture. Furthermore, the addition of the phenolic compound has been found to minimize crystallization of the dihydroxy within the mixture. In a preferred embodiment, the phenolic compound is added such that its concentration is between 0.1 and 40 weight % of the total weight of the monomers in the non-reactive monomer mixture, for example between 0.2 and 30 weight %, and more preferably in a weight % of between 2 and 25. As described above, if the diaryl carbonate employed is bismethylsalicylcarbonate (BMSC) the preferred phenolic compound for addition is the degradation by-product of BMSC (i.e. methyl salicylate) as compared to phenol for systems using DPC as the diaryl carbonate.

In another embodiment, the method of the present invention comprises steps from a one or more embodiments described above.

The Non-Reactive Monomer Mixture

The present invention also provides a non-reactive monomer mixture that is suitable for use in a polymerization reaction to form polycarbonate. The non-reactive monomer mixture consists of a dihydroxy component dissolved in a melted diaryl carbonate, wherein the dihydroxy component comprises one or more dihydroxy compounds. The dihydroxy component has less than 600 ppb alkali metal, an acid stabilizer, or both less than 600 ppb alkali metal and an acid stabilizer. The dihydroxy compounds of the dihydroxy component and the diaryl carbonate are present in a mole ratio of from 0.9 to 1.1 and the monomer mixture is at a temperature between the saturation point of the monomer mixture and the highest melting temperature of the individual dihydroxy compounds. In a preferred embodiment the non-reactive monomer mixture is at a temperature greater than the melting point of the diaryl carbonate and below the melting point of the dihydroxy compound. In one embodiment the mixture further comprises an ester substituted phenol such as methyl salicylate where the diaryl carbonate is BMSC. In another embodiment the non-reactive monomer mixture comprises phosphorus containing acid as the acid stabilizer. This non-reactive monomer mixture can then be stored for later use or transport to a polycarbonate production facility. The non-reactive monomer mixture is preferably stored subject to above, at a temperature less than 200° C., more preferably less than 180° C., 170° C., 160° C. and most preferably less than 150° C.

Forming Pol carbonate and the Melt Polymerization Process:

The non-reactive monomer mixture as described in any of the embodiments as described above may be used in the formation of polycarbonate in a subsequent melt polymerization reaction by adding a catalyst and allowing the mixture to react. Melt polymerization reactions that create the transesterification between the free hydroxyl ends of dihydroxy compounds with the carbonate source are known and are not particularly limited with respect to the present invention. For example, U.S. patent application Ser. Nos. 11/427,861 and 11/427,885, which are incorporated herein by reference for all purposes, disclose preferred processes for the melt production of polycarbonate.

In one embodiment an alpha/beta transesterification catalyst system, as described above, is added to the non-reactive monomer mixture (as described in any of the above embodiments) to form a melt reaction mixture that is subsequently treated under melt polymerization conditions to build molecular weight of the polycarbonate. It is also possible to add catalyst to the non-reactive monomer mixture while it is being treated under melt polymerization conditions).

In one embodiment alpha transesterification catalyst added to the non-reactive monomer mixture is between $1.0 \times 10^{-8}$ and $1 \times 10^{-3}$, preferably between $1.0 \times 10^{-6}$ and $2.5 \times 10^{-4}$ moles of alpha transesterification catalyst per mole of dihydroxy compound employed. The melt reaction mixture is then heated at one or more temperatures in a range from 100° C. to 500° C., preferably from 100° C. to 300° C., and still more preferably from 150° C. to 250° C. Upon heating, the transesterification reaction occurs to produce a mixture comprising an equilibrium mixture of oligomeric polycarbonate, by-product phenolic compound, transesterification catalyst, and low levels of the starting materials, dihydroxy compound and diaryl carbonate. This is referred to as "equilibrating" the reactants. The "equilibrated" product mixture is then introduced into a devolatilizing extruder, such as that as described in U.S. Pat. No. 7,132,498 which is incorporated herein by reference for all purposes, also operating under melt polymerization conditions, to effect removal of the by-product ester-substituted phenol while converting the oligomeric polycarbonate into a higher molecular weight product polycarbonate.

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. A comparative example may or may not be an example within the scope of the present invention. CSTR stands for continuous flow stirred-tank reactor.

Illustration 1 Preparation and Properties of Various Non-Reactive Monomer Mixtures Description of General Procedure to Determine the Lowest Dissolution Temperature (LDT) and Lowest Stable Temperature (LST) of Non-Reactive Monomer Mixtures:

The Lowest Dissolution Temperature (LDT) is the approximate lowest temperature at which a homogenous solution can be prepared within a period of less than about an hour from a particular non-reactive monomer mixture composition. In other words, the LDT is the lowest temperature at which the least soluble component of a particular non-reactive monomer mixture composition dissolves in the other components to give a mixable, low viscosity, free-flowing non-reactive monomer mixture within a period of about 1 hour. The LDT is thus the minimum temperature required to prepare a particular non-reactive monomer mixture composition.

The Lowest Stable Temperature (LST) is the approximate lowest temperature at which a particular non-reactive monomer mixture composition remains liquid, free-flowing and capable of being mechanical stirred. Typically the LST is about 5° C. above the temperature at which the particular non-reactive monomer mixture crystallizes, solidifies, or precipitates. The LST is thus the minimum temperature required to maintain a particular non-reactive monomer mixture composition in free-flowing liquid form in which it can be transferred by means of pumps, valves, fluid flow and gravity.

The following process was carried out for determining the LDT and LST values of the example non-reactive monomer mixture compositions. Bismethylsalicylcarbonate (BMSC) was used as carbonate in all of these experiments, and a stoichiometric molar ratio of 1.02 (BMSC/diols) was used. In the case of poly(carbonate-co-ester)s, the stoichiometric molar ratio was also 1.02 (BMSC/(diols+diacids)). The monomers of the non-reactive monomer mixture formulation were weighed out into a round-bottom flask, and the flask was then purged with nitrogen. The flask was then heated to 115° C. and subsequently heated in steps of 10° C. per 10 minutes under vigorous stirring with a magnetic stir bar and under a slight overpressure of nitrogen. The temperature at which all of the components dissolved to give a homogeneous transparent mixable solution was then recorded as the LDT for that composition.

After the LDT was reached for a particular non-reactive monomer mixture composition, the non-reactive monomer mixture was allowed to cool in steps of 10° C. per 10 minutes under vigorous stirring with a magnetic stir bar and under a slight overpressure of nitrogen. The lowest temperature at which the non-reactive monomer mixture remained clear and transparent with no precipitation and at which it could still be stirred by the magnetic stir bar was then recorded as the LST for that composition.

The LDT and LST values for various non-reactive monomer mixtures are reported below in Table 3. The content of each monomer is given as a mole % relative to the molar carbonate (BMSC) content. In the table it is noted if a longer period of time than 1 hour was required for the dissolution process at the LDT for a particular non-reactive monomer mixture composition.

Additionally it was of interest in these tests to determine whether or not conversion of the monomers was required or helpful for a particular composition to dissolve and form a non-reactive monomer mixture. Conversion of monomers could occur due to the presence of catalytic metal impurities in the monomers or by intentional addition of catalyst. Conversion can be useful in that it may reduce the (LDT) and thus minimize exposure of the monomers to high temperatures. Conversion can be induced by simply adding an organic and/or inorganic transesterification catalyst such as a base. In some of the examples (Example 5-9), more conversion was intentionally induced through the addition of 50 mEq of tetramethylammonium hydroxide (TMAH) relative to the total diol and/or diacid molar content of the non-reactive monomer mixture formulation. Conversion can be undesirable though in that the presence of catalytic species may cause the formation of byproducts such as internal ester linkages or chain-stopping end groups such as alkyl carbonates and/or alkyl ethers. In addition, conversion may cause an increase in molecular weight and thus increase in the LST. It is reported in Table 3 whether conversion was found to occur at the time of dissolution for selected non-reactive monomer mixtures. It is noted that the glassware used in these tests was treated for at least 24 hours in a 0.1 HCL acid bath and then rinsed with MilliQ deionized water until the rinse water was pH neutral.

Another aspect to be evaluated in these studies was whether devolatization of monomers from the non-reactive monomer mixture occurred to form insoluble crystals on the exposed surfaces of the vessel containing the non-reactive monomer mixture. The resulting changes in the non-reactive monomer mixture composition may cause uncontrolled changes in the stoichiometric ratio and thus molecular weight of the polymer obtained from the non-reactive monomer mixture. Therefore the flasks were visually inspected for the formation of crystalline deposits during the run. If significant crystalline deposits were observed (Example 11), additional runs were carried out using various quantities of added methyl salicylate (mass % relative to total mass of formulation) to suppress this effect.

During the entire process of determining the LDT and LST values for a particular composition, it was noted whether any loss of monomers by devolatization and subsequent formation of solid crystalline deposits had occurred.

In order to determine whether conversion was required to prepare a particular non-reactive monomer mixture composition or occurred due to catalytic impurities, a sample of the formed non-reactive monomer mixture was taken and analyzed by HPLC for the presence of methyl salicylate (MS), the phenolic byproduct of the transesterification reaction of BMSC. The level of MS found gives a measure of the level of conversion in the non-reactive monomer mixture, and the absence of MS indicated that no conversion had occurred in the non-reactive monomer mixture. If conversion was found to have occurred, it was then tested in some examples (Examples 12-14) as to whether the non-reactive monomer mixture could be prepared in the presence of an acidic quencher, and whether the acidic quencher would prevent conversion or not. In the examples here, a level of 100 ppm of $H_3PO_4$ relative to the total mass of the non-reactive monomer mixture formulation was added as a quencher.

TABLE 3

Various monomer mixture compositions and their LDT and LST values

| | Monomer 1 | | Monomer 2 | | Monomer 3 | | | monomer mixture properties | | |
|---|---|---|---|---|---|---|---|---|---|---|
| Example | Identity (mol %) | Tm (° C.) | Identity (mol %) | Tm (° C.) | Identity (mol %) | Tm (° C.) | Processing Additive | LDT (° C.) (time) | LST (° C.) | Conversion/ Crystallization |
| 1 | 50% BPA | 158-159 | 50% PPP-BP | 293-296 | — | — | None | 195 | 155 | N.M./None |
| 2 | 50% BPA | 158-159 | 50% BP | 280-282 | — | — | None | 205 | 195 | N.M./None |
| 3 | 100% DMBPC | 190 | — | — | — | — | None | 165 | <120 | 13/None |
| | | | | | | | H3PO4 | 165 | <120 | 5/None |
| 4 | 40% BPA | 158-159 | 60% HQ | 171 | — | — | None | 135 | <120 | 1/None |
| | | | | | | | H3PO4 | 135 | <120 | 0/None |
| 5 | 63.3% BPA | 159-159 | 34.1% PPP-BP | 293-296 | 2.6% Pluronics | 7 | None | 195 | 95 | N.M./None |
| | | | | | | | TMAH | | 145 | N.M./None |
| 6 | 50% BPA | 158-159 | 50% SBI | 217-218 | — | — | None | 155 | 100 | 0/None |
| | | | | | | | TMAH | 145 | 115 | N.M./None |
| | | | | | | | H3PO4 | 155 | 100 | 0/None |
| 7 | 83% BPA | 158-159 | 17% DDDA | 125-130 | — | — | None | 140 | 90 | 1/None |
| | | | | | | | TMAH | 135 | 90 | N.M./None |
| | | | | | | | H3PO4 | 140 | 90 | 0/None |
| 8 | 50% PPP-BP | 293-296 | 50% RS | 110-113 | — | — | None | 172 | 120 | 34/None |
| | | | | | | | TMAH | 158 | 135 | N.M./None |
| | | | | | | | H3PO4 (after dissolution) | 172 | 120 | 34/None |
| 9 | 20% PPP-BP | 293-296 | 40% HQ | 171 | 40% MeHQ | 126 | None | 180 | 100 | <5/None |
| 10 | 75% PPP-BP | 293-296 | 25% DDDA | 125-130 | — | — | None | 180 | 166 | N.M./None |

TABLE 3-continued

Various non-reactive monomer mixture compositions and their LDT and LST values

| | Monomer 1 | | Monomer 2 | | | Non-reactive monomer mixture properties | | |
|---|---|---|---|---|---|---|---|---|
| Example | Identity (mol %) | Tm (° C.) | Identity (mol %) | Tm (° C.) | Processing Additive | LDT (° C.) (time) | LST (° C.) | Conversion/ Crystallization |
| 16 | 50% BPA | 158-159 | 50% MeHQ | 126 | None | 130 | 80 | 0/None |
| | | | | | H3PO4 | 130 | 80 | 0/None |
| 17 | 50% BPA | 158-159 | 50% RS | 110-113 | None | 130 | 90 | 0/None |
| | | | | | H3PO4 | 130 | 90 | 0/None |
| 18 | 50% BPA | 158-159 | 50% DMBPC | 190 | None | 140 | 95 | 0/None |
| | | | | | H3PO4 | 140 | 95 | 0/None |
| 19 | 50% BPA | 158-159 | 50% TBHQ | 125-130 | None | 130 | 90 | 0/None |
| | | | | | H3PO4 | 130 | 90 | 0/None |
| 20 | 100% BPA | 158-159 | — | — | None | 130 | 90 | 0/None |
| | | | | | H3PO4 | 130 | 90 | 0/None |

Discussion of the Preparation of Non-Reactive Monomer Mixtures and their LDT and LST Values:

LDT and LST Values:

A comparison of the LDT values for the non-reactive monomer mixtures and the melting points of the monomer components of the non-reactive monomer mixtures in Table 3 demonstrates that non-reactive monomer mixtures can be prepared in all cases at temperatures that are far below the melting points of the monomers. This reduction in temperature is most significant (on the order of 100° C. or more) in the case of non-reactive monomer mixtures containing the monomers having the highest melting points, PPP-BP (Examples 1, 5, 9-10, 12-14) and BP (Example 2). It should be noted that in all cases the LDT's are about 200° C. or less. Therefore simpler and less expensive heating systems and less energy is required to prepare these free-flowing non-reactive monomer mixtures versus the alternative process of melting the monomers separately and then adding them together in the molten phase.

A comparison of the LST versus LDT values in Table 3 indicate that a further reduction in temperature of on the order of about 40 to 60° C. was possible after dissolution to form the non-reactive monomer mixture. Therefore the non-reactive monomer mixtures can be held until they are ready to be oligomerized at temperatures that are on the order of about 150° C. below the melting points of their highest melting monomer. This large-scale reduction in thermal exposure of the monomers prior to their reaction can be quite beneficial in minimizing thermal degradation reactions, discoloration, and formation of chainstopping byproducts such as salicyl OH and/or alkyl carbonates and/or alkyl ethers.

Addition of Catalyst:

A comparison of the LDT and LST values in Table 3 for the Examples having addition of TMAH as catalyst (Examples 5-8), shows that adding catalyst and the resulting increase in conversion can often have a minor benefit in reducing the LDT by about 50 to 10° C. On the other hand, the benefit is marginal because the presence of the catalyst and resulting formation of higher molecular weight oligomer species typically increased the LST of the non-reactive monomer mixture by up to 10 or 20° C. In addition, as mentioned earlier, the presence of additional catalyst may cause the formation of color bodies and/or chainstopping byproducts.

Minimization of Devolatization/Crystallization Losses:

It should be noted that only the BPA/HQ/MeHQ terpolymer formulation on Example 11 gave significant devolatization/crystallization losses of monomer from the non-reactive monomer mixture. Analyses of the crystalline deposits on cold-spots of the reaction flask indicated that the deposit was composed on hydroquinone and methyl hydroquinone deposits. Reducing the temperature of the non-reactive monomer mixture was found to reduce the rate of crystalline deposition/monomer loss. This minimization in monomer loss is believed to be a result of the reduction in vapor pressure of the volatile monomers at reduced temperatures. In this example non-reactive monomer mixtures were also prepared in which various amounts of methyl salicylate (MS) were added to the monomers. It is believed that the presence of a volatile inert species like MS has two effects: (1) it helps minimize the devolatization losses of monomers because it contributes significantly to the vapor pressure through its own volatility and (2) it creates a mild reflux process in which MS evaporates and then condenses on walls of the reactor inhibiting the formation of crystalline deposits and/or washing them back into the non-reactive monomer mixture.

Addition of Acid:

In Example 12, it was noted that formation of non-reactive monomer mixtures containing PPP-BP resulted in significant conversion due to presence of catalytic metallic salt contaminants in this monomer. Because the presence of catalytic species in non-reactive monomer mixture may cause byproduct formation, especially at high temperatures. It was then determined whether non-reactive monomer mixtures could still be prepared from PPP-BP in the presence of an acidic additive which would inhibit conversion. Examples 12-14 demonstrate that non-reactive monomer mixtures can be prepared from PPP-BP in the presence of an acid and without conversion, but a higher dissolution temperature and longer dissolution time is required in this case. However in these examples it was found that the acid could be instead added only after the initial dissolution of all the monomers. Addition of acids to already prepared non-reactive monomer mixtures was found to quench further reaction without affecting the LST of the non-reactive monomer mixture.

Figure 2:
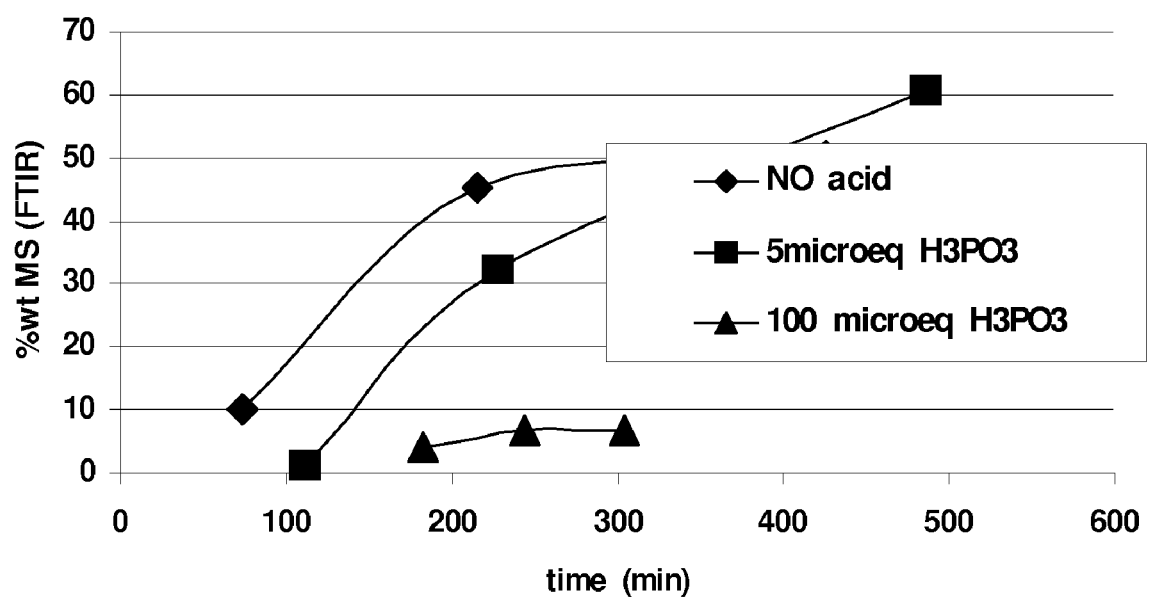
FIG. 2-5 are graphical representations of results obtained in the example section.
Figure 3:
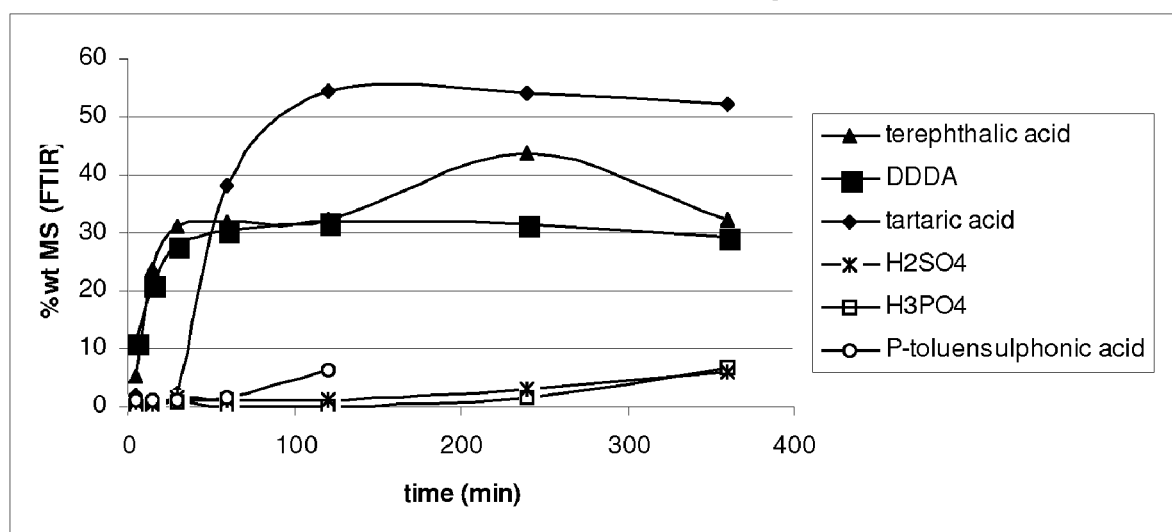

FIG. 2 demonstrates that increasing the concentration of the acidic quencher increases the induction period before appreciable conversion/reaction occurs. FIG. 3 demonstrates that various organic and inorganic acids can be used to quench conversion (suppress the formation of MS byproduct) in non-reactive monomer mixtures. The most effective quenchers appear to be inorganic acids due to their lower volatility, greater thermal stability, and stronger acidity.

Table 3.1 below illustrates the effect of an acid stabilizer on a non-reactive monomer mixtures' conversion rates during storage. In Examples 21 to 23, monomer mixtures were prepared and in one case no additive was added and in the other case 100 ppm of $H_3PO_4$ relative to the total mass of the monomer mixture was added as a quencher either before dissolution (Examples 21 and 22) or after dissolution (Example 23). It can be seen that in Example 21 very little reaction occurs as a function of time during storage of the monomer mixture (conversion rate of less than about 0.1% per hour) in the case of the monomer mixture either with or without the added quencher, probably due to the low metallic impurities of these monomers, the low storage temperature, and the quenching effect of the DDDA monomer. Therefore both the monomer mixtures in Example 21 are non-reactive monomer mixtures. In Example 22, the BPAP monomer contains several ppms of metallic impurities however, and thus the monomer mixture not containing the acid stabilizer very quickly achieves a conversion level of more than 60%. In the corresponding monomer mixture prepared in the presence of the acid stabilizer, the conversion level is quite low (<1%) and does not change further with time (conversion rate of less than about 0.1% per hour). Therefore due to the presence of the metallic impurities, only the monomer mixture containing the acidic stabilizer in Example 22 is a "non-reactive monomer mixture". In Example 23, the presence of several ppms of metallic impurities in the PPP-BP causes the conversion level to be high (>60%) already in the first measurement (t=0 h) of the monomer mixture prepared without the addition of the acid stabilizer. In the case of the monomer mixture to which the acid stabilizer was added as soon as dissolution occurred, the conversion level in the first measurement (t=0 h) is lower (about 41%) and the conversion rate remains low (less than about 1% per hour). Therefore due to the presence of the metallic impurities, only the monomer mixture to which the acidic stabilizer was added in Example 23 is a "non-reactive monomer mixture". It should be noted that the measured conversion level varies very slightly at this temperature due to some minor devolatization of the methyl salicylate.

Polymerization of Non-Reactive Monomer Mixtures

The following examples demonstrate that non-reactive monomer mixtures can be subsequently polymerized batch or continuous polymerization modes using a variety of reaction system configurations and reaction modes such a "normal" stoichiometric ratio (excess carbonate) and "reverse" stoichiometric ratio (excess diol).

Illustration 2: Small-Scale Batch Melt Reaction Demonstrating that Non-Reactive Monomer Mixture can be Quenched with Acid to Suppress Byproduct Formation Over Several Hours of Hold Time and then Polymerized by Adding Catalyst and Carrying Out Normal Polymerization Procedure Two reaction tubes containing a monomer mix of BPA and BMSC, with a BMSC/BPA molar ratio equal to 1.03 were prepared. Both tubes were deoxygenated. Then, a concentration $25 \times 10^{-3}$ mol $H_3PO_4$ relative to BPA was added to one of the tubes and no quencher was added to the second tube. Both tubes were heated up following the same polymerization profile (Table 4). The catalyst system in these reactions was an aqueous solution containing tetramethyl ammonium hydroxide and sodium hydroxide in a concentration sufficient to give a catalyst loading of $25 \times 10^{-5}$ mol TMAH/mol BPA and $2 \times 10^{-6}$ mol NaOH/mol BPA when added to the reaction tubes.

TABLE 4

Small-Scale Batch Polymerization Reaction Profile

| time | Remarks |
| --- | --- |
| — | Set Treactor @ 200° C., To @ 100° C., P @ 1000 mbar add quencher |
| 0:00:00 | All Set |
| 0:06:00 | Start stirrer |
| 4:30:00 | add catalyst |
| 4:45:00 | Set p @ 500 mbar |
| 5:00:00 | Treactor to @ 270° C. |
| 5:05:00 | T reactor to @ 300° C. and p @ 0 mbar |
| 5:25:00 | Stop reaction |

The polymer obtained was analyzed by proton NMR in order to check the byproducts levels and the molecular weight properties were characterized by size exclusion chromatography (SEC) relative to PS standards. Both polymers reach a similar Mw build up after the reaction, but the levels of I-SC (internal salicyl carbonate) and methyl carbonate end groups are lower for the polymer that was prepared from a non-

TABLE 3.1

Stability of Monomer Solution Against Conversion During Their Storage

|  | Monomer 1 | | Monomer 2 | | | monomer mixture properties | | | | | | |
| --- | --- | --- | --- | --- | --- | --- | --- | --- | --- | --- | --- | --- |
|  |  |  |  |  |  |  |  | Conversion Levels (%) as a function of time | | | | |
| Example | Identity (mol %) | Tm (° C.) | Identity (mol %) | Tm (° C.) | Processing Additive | Dissolution T (° C.) | Storage T (° C.) | t = 0 h | t = 1 h | t = 2 h | t = 3 h | t = 4 h |
| 21 | 83% BPA | 158-159 | 17% DDDA | 125-130 | None | 140 | 95 | 0.1 | 0.1 | 0.2 | 0.2 | 0.2 |
|  |  |  |  |  | H3PO4 | 140 | 95 | 0.2 | 0.2 | 0.2 | 0.2 | 0.2 |
| 22 | 50% BPA | 158-159 | 50% BPAP | 188-191 | None | 140 | 95 | >60 | >60 | >60 | >60 | >60 |
|  |  |  |  |  | H3PO4 | 140 | 95 | 0.8 | 0.8 | 0.8 | 0.8 | 0.8 |
| 23 | 65% BPA | 158-159 | 35% PPP-BP | 293-296 | None | 190 | 125 | >60 | >60 | >60 | >60 | >60 |
|  |  |  |  |  | H3PO4 | 190 | 125 | 41.5 | 41.2 | 41.3 | 41.6 | 40.8 | reactive monomer mixture quenched with acid during the melt-mixing step at 200° C. (See Table 5).

TABLE 5

Molecular weight and byproduct properties of BPA homopolymers produced with and without quenching of non-reactive monomer mixture

| | Analysis of Polymer Properties | Monomer Solution Quenched with 100 ppm H3PO4 | Monomer Solution Not Quenched |
|---|---|---|---|
| proton NMR | I-SC (mole %) | 0.74 | 1.2 |
| | Methyl Carbonate (mole %) | 0.35 | 0.81 |
| SEC | Mw PS (g/mol) | 28500 | 29200 |
| | Mn PS (g/mole) | 10800 | 11100 |

Therefore it can be concluded that undesired byproduct formation can be minimized by quenching non-reactive monomer mixtures with acids. Such polymers prepared from quenched non-reactive monomer mixture naturally contain some low level byproducts that are formed later in the subsequent polymerization stage after the catalyst addition. Nonetheless they will have lower byproduct levels than non-reactive monomer mixtures in which appreciable conversion takes place. It can also be concluded that quenching of non-reactive monomer mixtures does not interfere with their subsequent polymerization after catalyst is added.

Illustration 3: Polymerization of a Non-Reactive Monomer Mixture in a Reactor System Comprising a Batch Reactor and a CSTR in Combination with a Reactive Extruder Working Example 1

Polymerization of Terpolymer Non-Reactive Monomer Mixture Containing Catalyst at 100° C.

Figure 4:
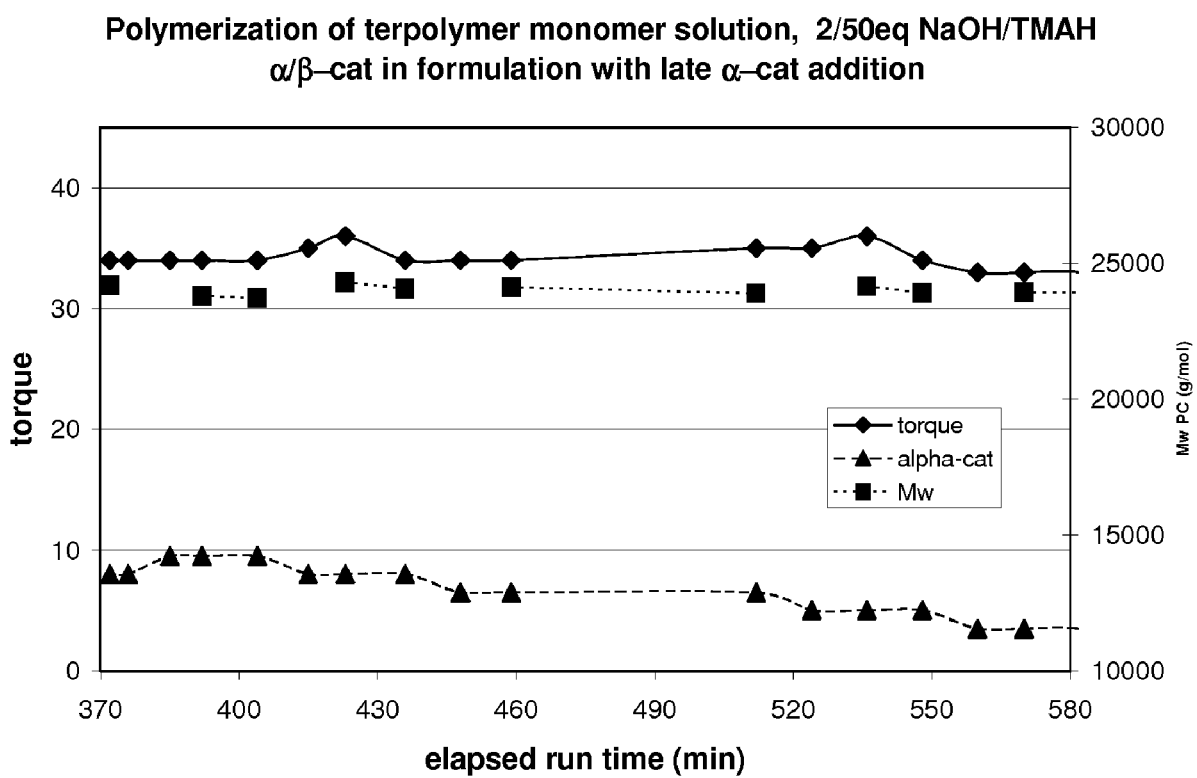

A composition of BPA/MeHQ/HQ 33/33/34 (mole %) was dissolved in BMSC in a 1st continuous stir reactor (CSTR) at a temperature of 120° C. and a pressure of 800 mbar. A catalyst solution of 25 μeq TMAH and 2 μeq NaGH (relative to total diol content) in water was added to the formulation. The formulated BMSC/diol mol ratio was 1.0175. After approximately 1 hour the agitator was started at a speed of 500 rpm. Approximately 1 hour later a homogenous solution was obtained and the temperature of this batch reactor was reduced to 100° C. At this point a small amount of crystals were observed on the 1st batch reactor cover sight glass. After 30 minutes the solution was then fed to a CSTR at a flow rate of 50 kg/hr. The temperature of the CSTR was kept at 170° C. When a reactor level of approximately 40% (approximately 2 hrs residence time) was obtained in the CSTR, the feed was stopped and the mixture was allowed to reach equilibrium. After 2.5 hours of equilibration time, the non-reactive monomer mixture feed to the CSTR was restarted and the oligomer in the CSTR was continuously fed together with an alpha catalyst solution to a ZSK-25 reactive extruder at a rate of 11.5 kg./hr. This alpha catalyst solution was sufficiently concentrated to give an additional alpha catalyst loading of 1 to 6 μeq of Na catalyst (depending on addition rate) relative to the total diol content of the formulation. The ZSK-25 reactive extruder is a 25 mm diameter, twin screw, co-rotating, intermeshing extruder having a length to diameter ratio (LOD) of about 59. Extrusion at standard conditions yielded a polymer with an average Mw of 24,500 g/mol relative to PC standards. No operational issues were observed during the run. Polymer Mw stability and byproduct formation were improved versus a batch run with the same composition (See table 6). A graphical representation of the data obtained over the time of continuous operation is given in FIG. 4.

TABLE 6

Comparison of Polymer Data for Batch Oligomerization Versus Continuous Polymerization of a Non-reactive monomer mixture (BPA/MeHQ/HQ: 33/33/34)

| | Average Polymer Analytical Data | | | | | |
|---|---|---|---|---|---|---|
| Polymerization Method | Mw PC (g/mol) | delta Mw PC/h | MS (ppm) | I-SC (mole %) | Methyl Carbonate (mole %) | Methyl Ether (mole %) |
| Batch Oligomerization | 27,500 | 560 | 70 | 0.49 | 0.3 | 0.14 |
| Continuous Polymerization of Monomer Solution | 24,500 | 520 | 52 | 0.4 | 0.34 | 0.1 |

Working Example 2

Polymerization of Terpolymer Non-Reactive Monomer Mixture Not Containing Catalyst at 115° C.

Figure 5:
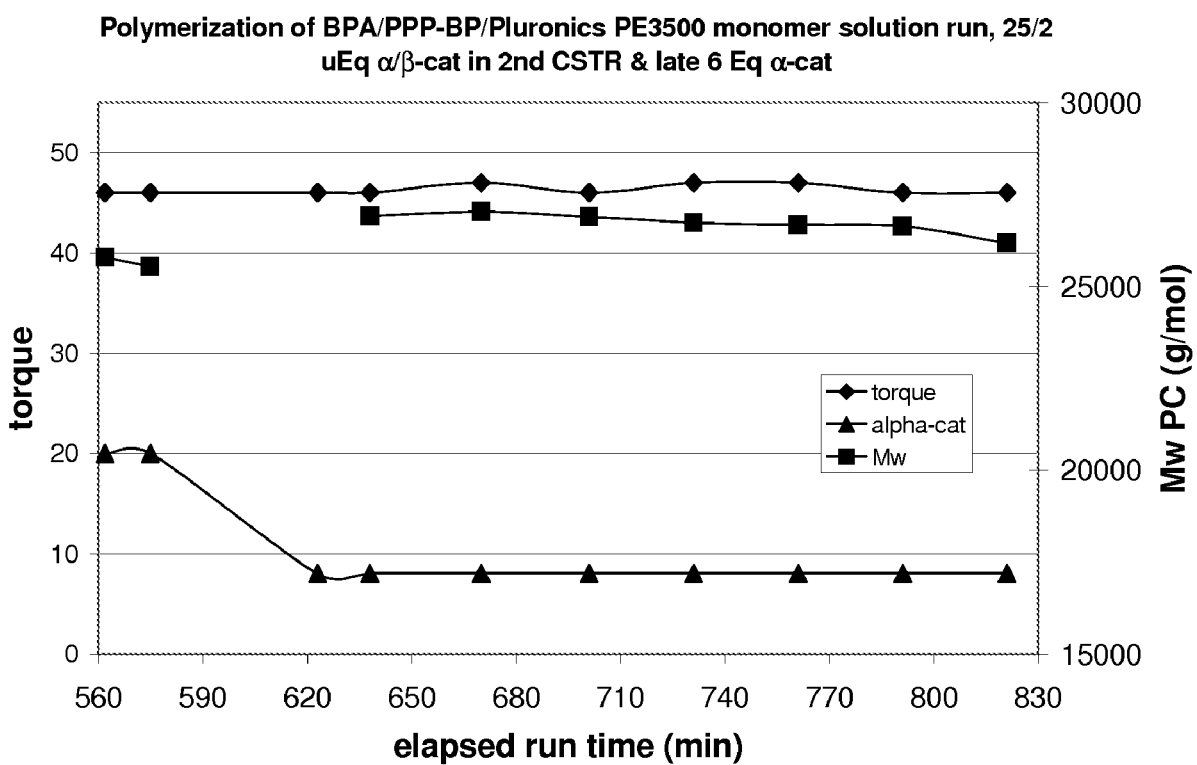

Using the same process as in working example 1, a composition of IBPA/PPP-BP 65/35 and 15% w/w Pluronics PE3500 was dissolved in BMSC at a tank temperature of 175° C. No catalyst solution was added to the formulation however, and the formulated BMSC/diol mol ratio was 1.023. After a homogenous solution was obtained, temperature of the batch reactor was reduced to 115° C., and no crystals were observed on the reactor cover sight glass. A catalyst solution of 25 uEg of TMAH and 2 uEg NaOH (relative to total diol) was also fed with the non-reactive monomer mixture to the CSTR. A catalyst solution yielding an additional alpha catalyst concentration of 1 to 6 μeq Na (depending on the addition rate) relative to total diol was fed together with the oligomer to the extruder. Extrusion at standard conditions obtained a polymer with an average PC Mw 26,500 g/mol. No operational issues were observed during the run. Polymer Mw stability and byproduct formation were improved versus a batch run with the same composition (See table 7). A graphical representation of the data obtained over the time of continuous operation is given in FIG. 5.

TABLE 7

Comparison of polymer data for batch oligomerization versus continuous
polymerization of a non-reactive monomer mixture (BPA/PPP-BP/Pluronics PE3500)

| | Average Polymer Analytical Data | | | | | |
|---|---|---|---|---|---|---|
| Polymerization Method | Mw PC (g/mol) | delta Mw PC/h | MS (ppm) | I-SC (mole %) | Methyl Carbonate (mole %) | Sal-OH (ppm) |
| Batch Oligomerization | 26,000 | −330 | 161 | 1.13 | 0.56 | 161 |
| Continuous Polymerization of Monomer Solution | 26,500 | 90 | 135 | 0.47 | 0.42 | 135 |

Illustration 4: Trials of Non-Reactive Monomer
Mixture Method on Plug-Flow Reactor/Flash
Devolatilization/Reactive Extruder Hybrid
System—Normal Ratio In these examples, the plug-flow reactor/flash devolatilization/reactive extruder hybrid system shown in FIG. 1 was used. In this system the batch reactor A is charged at ambient temperature and pressure with the solid diol monomers and solid BMSC; and the solid monofunctional phenol capping agent PCP. The PCP chain stopper was added in amounts to yield approximately 40 mole % of PCP end groups at the targeted molecular weight. The standard BMSC/diol monomer molar ratio is 1.02. After this the monomer mix reactor was sealed shut. The system was deoxygenated by briefly evacuating the monomer mix reactor and then introducing nitrogen. This process was repeated three times. Then, in order to melt the monomers, the pressure is set to 800 mbar and the temperature is increased at about 120° C. The liquid mixture is continuously stirred.

Using a piston pump (B), the molten monomer mix is then fed to a preheater (C). This preheater heats up the monomer mix to the desired oligomerization temperature. After the preheater, the catalyst solution (tetrametylammonium hydroxide and /or sodium hydroxide aqueous solution) is added by using pumps D and E. The oligomerization reaction takes place in the plug flow reactor (F). The oligomerization temperatures typically range between 150 and 230° C., the residence time in the plug flow reactor varies between 2-10 minutes. The pressure is typically kept at about 5 bar, in order to ensure that no vapor phase is formed.

The oligomer is then fed feed-to the preheater G. The temperature in this preheater range between 150 and 240° C. The pressure is kept below 500 mbar in order to start evaporation of methylsalycilate. The concentration of MS remaining in the liquid phase (oligomer) varies between about 10 and 20 wt %. Then, the oligomer mixture is fed through the distributor to the flash vessel H. In the flash vessel, additional MS is removed and molecular weight is further increased. In the flash vessel the pressure typically varies between 50 and 300 mbar, the temperature is kept between 150 and 240° C.

The MS evaporated leaves the flash vessel and condenses in condensors K1 and K2. It is collected as a liquid in storage vessel L.

The oligomer is pumped out of the flash vessel to the extruder using the gear pump I. The amount of MS in this oligomer varies between 0.5 and 20 wt %, depending on the temperature and pressure settings of the flash vessel.

The extruder used is a ZSK-25 extruder. It is a 25 mm diameter, twin screw, co-rotating, intermeshing extruder having a length to diameter ratio (LOD) of about 59. The oligomer was fed to the extruder at a rate between 5 and 25 kg/h. The screw speed varies between 300 and 500 rpm. The barrels of the extruder are set at 300° C., the die head at 310° C. The ZSK-25 extruder is equipped with a high vacuum system to further remove the methyl salicylate formed as a byproduct in the polycondensation reaction.

Working Example 3

33/34/33 BPAlMeHQ/HQ Terpolymer Non-Reactive
Monomer Mixture at 100° C.

In this example a non-reactive monomer mixture was prepared by mixing 100.64 kg of BMSC, 11.14 kg of HQ, 12.19 kg of MeHQ, 22.42 kg of BPA, 1.213 kg of PCP and 10.24 kg of MS. The monomers were molten in a reactor at a temperature of 120° C. and a pressure of 800 mbar. The formulated BMSC/diol mol ratio was 1.024. As soon as a clear monomer mix solution was obtained, the monomer mix temperature was set to 100° C. and the non-reactive monomer mixture was pumped to the preheater. The non-reactive monomer mixture remained quite stable in color over the course of the run, and no appreciable formation of crystalline deposits on the surfaces of the CSTR was observed during the run. The preheater process temperature was 200° C. The non-reactive monomer mixture reached the plug flow reactor, where a solution containing 50 µeq TMAH/12 µeq NaOH (relative to diol feed rate) was added. The plug flow reactor temperature was 200° C. and the pressure 6 bar. The non-reactive monomer mixture throughput was 20 kg/h, and the residence time in the plug flow reactor was 5 minutes. At these conditions the oligomer at the exit of the plug flow reactor contained 60% wt MS. The oligomer was then fed to the second preheater (230° C., 600 mbar) and it then reached the flash vessel (230° C., 100 mbar). The oligomer was then fed on to the extruder. At these conditions the oligomer leaving the flash reactor contained 1.3% wt MS and had a Mw (PC) of 14,900 g/mol. Extrusion at standard conditions rendered a polymer with an average PC Mw 30,000 g/mol. No operational issues were observed during the run. The molecular weight residuals, byproducts and color remained quite constant over the entire run, and residual MS remained quite low (<90 ppm) and other residuals were not detected by HPLC analysis.

Working Example 4

BPA Homopolymer Non-Reactive Monomer Mixture at 100° C.

In this example a non-reactive monomer mixture was prepared using the same procedure as in the previous Working example 3 except as noted. First a non-reactive monomer mixture was prepared in the batch reactor from 64.26 kg of BMSC, 43.36 kg of BPA and 0.774 kg of PCP. A catalyst solution containing 50 μeq TMAH/8 μeq NaOH was added to the non-reactive monomer mixture in the plug flow reactor. The oligomer exiting the plug-flow reactor contained 48 wt % MS. The pressure was 500 mbar in the second preheater and 100 mbar in the flash vessel. Extrusion at standard conditions rendered a polymer with an average PC Mw of 28,000 g/mol. No operational issues were observed during the run. The molecular weight, residuals, byproducts and color remained quite constant over the entire run. Residual MS was quite low (<90 ppm), and other residuals were not detected by HPLC analysis.

Plug-Flow Reactor/Flash Devolatilization/Reactive Extruder Hybrid System—Reverse Ratio (Excess Diol)

Working Example 5

33/34/33 BPAIMeHQ/HQ Terpolymer Non-Reactive Monomer Mixture at 100° C.

In this example a non-reactive monomer mixture was prepared using the same procedure as in the previous working example 4 except as noted. A non-reactive monomer mixture was prepared by mixing 100.06 kg of BMSC, 11.40 kg of HQ, 12.47 kg of MeHQ, 22.935 kg of BPA, 1.499 kg of PCP and 12.02 kg of MS. The formulated BMSC/diol mol ratio was 0.995. The non-reactive monomer mixture throughput was 25 kg/h, and the residence time in the plug flow reactor was 4 minutes. The non-reactive monomer mixture remained quite stable in color over the course of the run, and no appreciable formation of crystalline deposits on the surfaces of the CSTR was observed during the run. The oligomer exiting the plug-flow reactor contained 60 wt % MS. The second preheater had a temperature of 220° C. and a pressure of 500 mbar, and the flash vessel had a pressure of 50 mbar. The oligomer was extruded at a screw speed of 300 rpm and a barrel temperature of 270° C. to yield a polymer with an average PC Mw of 14,500 g/mol. Mw, residuals, byproducts and color were very stable during the whole run, and no operational issues were observed. Analytical data for this run are shown below in Table 8.

The Working Examples 3, 4, and 5 demonstrate that non-reactive monomer mixtures can also be readily polymerized on plug-flow reactor/flash devolatilization/reactive extruder hybrid systems. The polymerization of non-reactive monomer mixtures on such hybrid systems was shown to give very stable operations and polymer properties as a function of run time in the case of both normal and reverse ratio polymerizations. Reverse ratio polymerizations are typically quite difficult to run in batch oligomerization processes because of the continuous increase in the content of chainstopping byproducts as a function of oligomerization hold time. This leads to a continuous drop in molecular weight over the course of a reverse ratio batch oligomerization run. Working Example 5 shows that the molecular weight in contrast is quite stable over the course of a polymerization of a reverse ratio non-reactive monomer mixture. It should be further noted that both working examples 3 and 5 demonstrate that the addition of MS to a non-reactive monomer mixture can be used to inhibit monomer losses due to devolatilization and/or crystallization without interfering with the polymerizability of the non-reactive monomer mixture.

TABLE 8

Analytical data for working example 5 polymerization of reverse ratio terpolymer non-reactive monomer mixture

| | Sample | [#] | 2 | 3 | 4 | 5 | 6 | 7 | 8 | 9 |
|---|---|---|---|---|---|---|---|---|---|---|
| | Time | [hh:mm] | 13:04 | 13:34 | 14:04 | 14:34 | 15:04 | 15:35 | 16:04 | 17:02 |
| | | | | | Properties | | | | | |
| GPC | Mw (PS) | [g/mol] | 23726 | 23740 | 23925 | 23768 | 23626 | 23847 | 24000 | 24122 |
| | Mn (PS) | [g/mol] | 9746 | 9743 | 9819 | 9738 | 9709 | 9760 | 9809 | 9846 |
| | Mw (PC) | [g/mol] | 14568 | 14574 | 14652 | 14586 | 14526 | 14619 | 14683 | 14735 |
| | Mn (PC) | [g/mol] | 5984 | 5981 | 6013 | 5976 | 5970 | 5983 | 6001 | 6014 |
| | D | [—] | 2.43 | 2.44 | 2.44 | 2.44 | 2.43 | 2.44 | 2.45 | 2.45 |
| HPLC | MS | [ppm] | 79 | 82 | 76 | 67 | 78 | 76 | 80 | 59 |
| | BMSC | [ppm] | <DL | <DL | <DL | <DL | <DL | <DL | <DL | <DL |
| Color | L* | [—] | 85.2 | 85.5 | 86.9 | 85.8 | 85.9 | 86.2 | 86.0 | 85.1 |
| Xrite | A* | [—] | 1.46 | 1.89 | 1.45 | 1.53 | 1.51 | 1.44 | 1.41 | 1.62 |
| | B* | [—] | 16.2 | 16.7 | 15.6 | 16.4 | 16.6 | 16.4 | 16.3 | 16.2 |

DL = Detection Limit

The invention claimed is:

1. A method of forming a non-reactive monomer mixture suitable for use in a melt transesterification reaction to form polycarbonate, the method comprising the steps of:

(i) providing a diaryl carbonate;

(ii) selecting a first dihydroxy compound, (iii) performing a dihydroxy conditioning step selected from the group consisting of:

(a) testing the first dihydroxy compound for the presence of alkali metal prior to forming the non-reactive monomer mixture, and if said alkali metal is present, performing a step selected from the group consisting of:
(I) treating the first dihydroxy compound to reduce the level of said alkali metal to an amount of less than 600 ppb,
(II) adding an acid stabilizer to the first dihydroxy compound, and
(III) a combination of steps (I) and (II), and
(b) treating the first dihydroxy compound with a step selected from the group of:
(I) treating the first dihydroxy compound to reduce the level of said alkali metal to an amount of less than 600 ppb,
(II) adding an acid stabilizer to the first dihydroxy compound, and
(III) a combination of steps (I) and (II),
(iv) adjusting the temperature of the diaryl carbonate to a first temperature that is:
greater than the melting point of the diaryl carbonate; and
below the melting point of the first dihydroxy compound;
(v) adding the first dihydroxy compound as a solid to the diaryl carbonate,
wherein the first temperature is selected such that the first dihydroxy compound added to the diaryl carbonate dissolves in the diaryl carbonate to produce a non-reactive monomer mixture.

2. The method of claim 1, further comprising the steps of lowering the temperature of the non-reactive monomer mixture, and storing the non-reactive monomer mixture for more than 24 hours.

3. The method of claim 2, wherein the temperature of the non-reactive mixture is stored as a solid.

4. The method of claim 1, further comprising the step of adding a phenolic compound to the diaryl carbonate either before adding the first dihydroxy compound or with the first dihydroxy compound.

5. The method of claim 4, wherein if the diaryl carbonate comprises BMSC the phenolic compound comprises methyl salicylate, and wherein if the diaryl carbonate comprises DPC the phenolic compound comprises phenol.

6. The method of claim 1, wherein the first dihydroxy compound and the diaryl carbonate are present in a mole ratio of from 0.9 to 1.1.

7. The method of claim 1, further comprising the step of selecting a second dihydroxy compound, wherein the first dihydroxy compound requires a higher temperature to dissolve in the diaryl carbonate than the second dihydroxy compound, lowering the temperature of the non-reactive monomer mixture to a second temperature sufficiently high to maintain the first dihydroxy compound in solution and to permit dissolution of the second dihydroxy compound, said second temperature being below the melting point of the second dihydroxy compound, and adding the second dihydroxy compound to the non-reactive monomer mixture as a solid at the second temperature, wherein the second temperature is selected such that the second dihydroxy compound added to the non-reactive monomer mixture dissolves in the non-reactive monomer mixture.

8. The method of claim 1, wherein the diaryl carbonate is provided as a solid and the first dihydroxy compound is added to the diaryl carbonate as a solid and then the diaryl carbonate is melted.

9. The method of claim 1, wherein the first dihydroxy compound is added as a solid to molten diaryl carbonate.

10. The method of claim 1, wherein the acid stabilizer comprises a phosphorus containing acid.

11. The method of claim 1, wherein the first temperature is less than 200° C.

12. A non-reactive monomer mixture consisting of a dihydroxy component dissolved in a melted diaryl carbonate, wherein the dihydroxy component comprises one or more dihydroxy compounds and wherein the dihydroxy component comprises less than 600 ppb alkali metal, an acid stabilizer, or both less than 600 ppb alkali metal and an acid stabilizer, wherein the dihydroxy compounds of the dihydroxy component and the diaryl carbonate are present in a mole ratio of from 0.9 to 1.1, and wherein the monomer mixture is at a temperature between the saturation point of the monomer mixture and the highest melting temperature of the individual dihydroxy compounds.

13. The mixture of claim 12, wherein the mixture further comprises a phenolic compound.

14. The mixture of claim 13, wherein the diaryl carbonate comprises BMSC and the phenolic compound comprises methyl salicylate.

15. The mixture of claim 13, wherein the diaryl carbonate comprises DPC and the phenolic compound comprises phenol.

16. The mixture of claim 12, wherein the acid stabilizer comprises a phosphorus containing acid.

17. The mixture of claim 12, wherein the temperature of the non-reactive monomer mixture is less than 200° C.

18. A method of forming polycarbonate comprising the steps of:
(A) forming a non-reactive monomer mixture suitable for use in a melt transesterification reaction to form polycarbonate, the method comprising the steps of:
(i) providing a diaryl carbonate;
(ii) selecting a first dihydroxy compound,
(iii) performing a dihydroxy conditioning step selected from the group consisting of:
(a) testing the first dihydroxy compound for the presence of alkali metal prior to forming the non-reactive monomer mixture, and if said alkali metal is present, performing a step selected from the group consisting of:
(I) treating the first dihydroxy compound to reduce the level of said alkali metal to an amount of less than 600 ppb,
(II) adding an acid stabilizer to the first dihydroxy compound, and
(III) a combination of steps (I) and (II), and
(b) treating the first dihydroxy compound with a step selected from the group of:
(I) treating the first dihydroxy compound to reduce the level of said alkali metal to an amount of less than 600 ppb,
(II) adding an acid stabilizer to the first dihydroxy compound, and
(III) a combination of steps (I) and (I),
(iv) adjusting the temperature of the diaryl carbonate to a first temperature that is:
greater than the melting point of the diaryl carbonate; and
below the melting point of the first dihydroxy compound;
(v) adding the first dihydroxy compound as a solid to the diaryl carbonate, wherein the first temperature is selected such that the first dihydroxy compound added to the diaryl carbonate dissolves in the diaryl carbonate to produce a non-reactive monomer mixture, (B) adding a catalyst to the non-reactive monomer mixture in an amount sufficient to initiate a polymerization reaction between the first dihydroxy compound and the activated diaryl carbonate, thereby forming a melt reaction mixture, (C) allowing the melt reaction mixture to react to build molecular weight, thereby preparing polycarbonate.

19. The method of claim 18, further comprising the steps performed before steps (B) and (C) of lowering the temperature of the non-reactive monomer mixture, and storing the non-reactive monomer mixture for more than 24 hours.

20. The method of claim 19, wherein the temperature of the non-reactive mixture is stored as a solid.

21. The method of claim 18, further comprising the step of adding a phenolic compound to the diaryl carbonate either before adding the first dihydroxy compound or with the first dihydroxy compound, wherein if the diaryl carbonate comprises BMSC the phenolic compound comprises methyl salicylate, and wherein if the diaryl carbonate comprises DPC the phenolic compound comprises phenol.

22. The method of claim 18, wherein the diaryl carbonate is provided as a solid and the first dihydroxy compound is added to the diaryl carbonate as a solid and then the diaryl carbonate is melted.

23. The method of claim 18, wherein the first dihydroxy compound is added as a solid to molten diaryl carbonate.

24. The method of claim 18, wherein the acid stabilizer comprises a phosphorus containing acid.

25. The method of claim 18, wherein the first temperature is less than 200° C.

* * * * *

UNITED STATES PATENT AND TRADEMARK OFFICE
CERTIFICATE OF CORRECTION

PATENT NO. : 7,601,794 B2  Page 1 of 1
APPLICATION NO. : 11/863659
DATED : October 13, 2009
INVENTOR(S) : Brack et al.

It is certified that error appears in the above-identified patent and that said Letters Patent is hereby corrected as shown below:

Column 38, Claim 18, Line 58 should read: -- (III) a combination of steps (I) and (II), --

Signed and Sealed this

Seventeenth Day of November, 2009

David J. Kappos
*Director of the United States Patent and Trademark Office*